United States Patent
Liu et al.

(10) Patent No.: US 10,469,577 B2
(45) Date of Patent: Nov. 5, 2019

(54) CACHING METHOD AND SYSTEM BASED ON CACHE CLUSTER

(71) Applicant: Huawei Technologies Co., Ltd., Shenzhen (CN)

(72) Inventors: Lixie Liu, Shenzhen (CN); Weikang Kong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/977,738

(22) Filed: May 11, 2018

(65) Prior Publication Data

US 2018/0262566 A1    Sep. 13, 2018

Related U.S. Application Data

(63) Continuation of application No. PCT/CN2016/101497, filed on Oct. 8, 2016.

(30) Foreign Application Priority Data

Jan. 29, 2016  (CN) .......................... 2016 1 0061189

(51) Int. Cl.
*G06F 12/00* (2006.01)
*H04L 29/08* (2006.01)
(Continued)

(52) U.S. Cl.
CPC ...... *H04L 67/1095* (2013.01); *G06F 12/0246* (2013.01); *H04L 67/1097* (2013.01);
(Continued)

(58) Field of Classification Search
None
See application file for complete search history.

(56) References Cited

U.S. PATENT DOCUMENTS

2002/0166031 A1* 11/2002 Chen ................... G06F 12/0813
711/141
2003/0028819 A1* 2/2003 Chiu ................... G06F 11/2089
714/5.11
(Continued)

FOREIGN PATENT DOCUMENTS

CN    102053802 A    5/2011
CN    102387204 A    3/2012
(Continued)

OTHER PUBLICATIONS

Machine Translation and Abstract of Chinese Publication No. CN102053802, dated May 11, 2011, 27 pages.
(Continued)

*Primary Examiner* — Daniel D Tsui
(74) *Attorney, Agent, or Firm* — Conley Rose, P.C.

(57) ABSTRACT

A caching method based on a cache cluster is provided, the method including determining a partition number of a caching partition corresponding to to-be-written data; querying, with a view service node according to the partition number, primary node information of the caching partition corresponding to the to-be-written data; receiving the primary node information that is of the caching partition corresponding to the to-be-written data and that is returned by a view service node, and sending a write request to a primary node of the caching partition corresponding to the to-be-written data; writing the to-be-written data into a local write-back cache according to the write request; and obtaining information about each secondary node of the caching partition corresponding to the to-be-written data from the view service node, and copying the to-be-written data to each secondary node of the caching partition corresponding to the to-be-written data.

12 Claims, 12 Drawing Sheets

(51) Int. Cl.
*G06F 12/02* (2006.01)
*G06F 16/182* (2019.01)

(52) U.S. Cl.
CPC ...... *H04L 67/2842* (2013.01); *G06F 16/1827* (2019.01); *G06F 2212/7203* (2013.01)

(56) References Cited

U.S. PATENT DOCUMENTS

2014/0359229 A1   12/2014  Cota-Robles
2016/0085650 A1*   3/2016  Kadayam ............ G06F 12/0868
                                                    714/6.23
2017/0351584 A1*  12/2017  Griffith ............... G06F 11/1471

FOREIGN PATENT DOCUMENTS

CN        105739924 A    7/2016
WO      2013024485 A2   2/2013

OTHER PUBLICATIONS

Machine Translation and Abstract of Chinese Publication No. CN102387204, dated Mar. 21, 2012, 10 pages.
Machine Translation and Abstract of Chinese Publication No. CN105739924, dated Jul. 6, 2016, 29 pages.
Foreign Communication From a Counterpart Application, PCT Application No. PCT/CN2016/101497, English Translation of International Search Report dated Dec. 29, 2016, 2 pages.

\* cited by examiner

CACHING METHOD AND SYSTEM BASED ON CACHE CLUSTER

CROSS-REFERENCE TO RELATED APPLICATIONS

This application is a continuation of International Application No. PCT/CN2016/101497, filed on Oct. 8, 2016, which claims priority to Chinese Patent Application No. 201610061189.4, filed on Jan. 29, 2016, both of which are hereby incorporated by reference in their entireties.

TECHNICAL FIELD

The present disclosure relates to the storage field, and in particular, to a caching method and system based on a cache cluster.

BACKGROUND

Among existing data center and existing storage products, high-speed non-volatile caching devices such as flash drives are widely used to increase access speeds of background shared storage. Cache write manners may include two: write-through and write-back.

Write-through means that, when data is written into a caching device, one copy of the data is also written into a shared storage device. An advantage of write-through is ease of operation, and data in the caching device is consistent with that in the shared storage device, so that data is not easily lost. A disadvantage of write-through is that a data access speed is relatively low, an overall read/write speed is greatly affected by the shared storage device, and it is relatively difficult to increase input/output operations per second (IOPS) of a system.

Write-back is as follows. Data is not synchronously written into a shared storage device when written into a caching device, and after the data is written into the caching device, a write success message may be returned to an upper-layer service, and the data is written into the shared storage device at an appropriate time by means of background management. An advantage of write-back is a high read/write speed, that is, high IOPS. A disadvantage of write-back is that operation management is complex and data inconsistency easily occurs when the caching device is faulty.

Because IOPS of a product is an important measure parameter for data center and storage products, write-back caching devices are widely used in various storage products. To overcome the problem that data inconsistency easily occurs in the write-back caching device, a mechanism that ensures data consistency needs to be added into the write-back caching device.

A manner in which two nodes are mutually mirrored is used in the prior art. Write-back cached content of one write-back caching device is mirrored to the other node. The manner is mainly as follows. When a write-back caching device receives a write service, the write-back caching device copies the request to a corresponding mirror write-back caching device, and the write operation is simultaneously performed on the mirror write-back caching device, so as to ensure data consistency between the two mutually mirrored write-back caching devices. Therefore, when one write-back caching device is faulty, data may be recovered and obtained from the corresponding mirror write-back caching device, so as to ensure data consistency.

It can be learned from the foregoing that the manner in which two write-back caching devices are mutually mirrored can solve consistency of two duplicates of write-back cache to some extent. However, in this manner, only two write-back caching devices are mutually mirrored, and a reliability requirement of a large-scale cluster cannot be met.

SUMMARY

Embodiments of the present disclosure provide a caching method and system based on a cache cluster, so as to meet a reliability requirement of a large-scale cluster.

According to a first aspect, a caching method based on a cache cluster is provided, where the cache cluster includes a view service node and multiple storage nodes, each storage node includes at least one write-back caching device, each write-back caching device includes multiple sub-partitions, a plurality of the sub-partitions forms one caching partition, each caching partition includes one primary sub-partition and at least one secondary sub-partition, the view service node is configured to record view information of each caching partition, the view information includes node information of a caching device in which each sub-partition included in each caching partition is located, a storage node in which a primary sub-partition of a first caching partition is located is a primary node of the first caching partition, a storage node in which each secondary sub-partition of the first caching partition is located is a secondary node of the first caching partition, the first caching partition is any caching partition in the cache cluster, and the method includes determining, by a caching client, a partition number of a caching partition corresponding to to-be-written data; querying, by the caching client with the view service node according to the partition number of the caching partition corresponding to the to-be-written data, primary node information of the caching partition corresponding to the to-be-written data; receiving, by the caching client, the primary node information that is of the caching partition corresponding to the to-be-written data and that is returned by the view service node, and sending, according to the primary node information of the caching partition corresponding to the to-be-written data, a write request to a primary node of the caching partition corresponding to the to-be-written data, where the write request carries the to-be-written data; writing, by the primary node of the caching partition corresponding to the to-be-written data, the to-be-written data into a local write-back cache according to the write request; and obtaining, by the primary node of the caching partition corresponding to the to-be-written data, information about each secondary node of the caching partition corresponding to the to-be-written data from the view service node, and copying the to-be-written data to each secondary node of the caching partition corresponding to the to-be-written data.

It can be learned from the foregoing that in an embodiment of the present disclosure, a write-back caching device is divided into multiple sub-partitions, and a plurality of the sub-partitions forms one caching partition. When the caching client needs to write data, the caching client first determines a partition number of a caching partition corresponding to to-be-written data, and this facilitates implementation of load balance. In addition, the view service node records view information of each caching partition, and the view information includes node information of a caching device in which each sub-partition included in each caching partition is located, so that the caching client can back up the to-be-written data to multiple caching devices. Therefore, reliability of the caching method is improved.

In a possible design, the method further includes determining, by the primary node of the caching partition corresponding to the to-be-written data, that all secondary nodes of the caching partition corresponding to the to-be-written data have completed copying of the to-be-written data; sending, by the primary node of the caching partition corresponding to the to-be-written data, a write response to the caching client; and receiving, by the caching client, the write response sent by the primary node of the caching partition corresponding to the to-be-written data, and determining that caching is completed.

In a possible design, before the writing, by the primary node of the caching partition corresponding to the to-be-written data, the to-be-written data into a local write-back cache according to the write request, the method further includes querying, with the view service node by the primary node of the caching partition corresponding to the to-be-written data, view information of the caching partition corresponding to the to-be-written data; and determining, by the primary node of the caching partition corresponding to the to-be-written data according to the view information of the caching partition corresponding to the to-be-written data, that the primary node itself is the primary node of the caching partition corresponding to the to-be-written data.

It can be learned from the foregoing that after receiving the write request sent by the caching client, instead of directly writing the to-be-written data into the local write-back cache, the primary node of the caching partition corresponding to the to-be-written data first determines that the primary node itself is the primary node of the caching partition corresponding to the to-be-written data. Therefore, this improves accuracy of operation execution, and avoids a misoperation generated because the primary node is switched after the caching client sends the write request.

In a possible design, the view information further includes a primary-partition switching quantity of the caching partition corresponding to the to-be-written data; and after the determining, by the primary node of the caching partition corresponding to the to-be-written data according to the view information of the caching partition corresponding to the to-be-written data, that the primary node itself is the primary node of the caching partition corresponding to the to-be-written data, the method further includes verifying that a primary-partition switching quantity that is of the caching partition corresponding to the to-be-written data and that is carried in the write request is consistent with the primary-partition switching quantity that is carried in the view information of the caching partition corresponding to the to-be-written data.

It can be learned from the foregoing that the view information on the view service node may be updated. By verifying that the primary-partition switching quantity that is of the caching partition corresponding to the to-be-written data and that is carried in the write request is consistent with the primary-partition switching quantity that is carried in the view information of the caching partition corresponding to the to-be-written data, it can be ensured that newest view information is stored on the primary node. When a verification result indicates inconsistency, the primary node is triggered to obtain the newest view information from the view service node.

In a possible design, the writing, by the primary node of the caching partition corresponding to the to-be-written data, the to-be-written data into a local write-back cache according to the write request includes generating, by the primary node of the caching partition corresponding to the to-be-written data, an entry of the to-be-written data according to the write request, where the entry includes an operation sequence number and an operation parameter; and writing the to-be-written data into the local write-back cache according to the operation sequence number and the operation parameter that are included in the entry.

It can be learned from the foregoing that the primary node generates the corresponding entry according to the write request, and then writes the to-be-written data into the local write-back cache according to the operation sequence number and the operation parameter that are included in the entry. Therefore, when the primary node receives multiple write requests, an execution order of each write request may be ensured, and it may be ensured that an earlier received write request is executed earlier.

In a possible design, the copying the to-be-written data to each secondary node of the caching partition corresponding to the to-be-written data includes sending, by the primary node of the caching partition corresponding to the to-be-written data, the write request and the entry to each secondary node of the caching partition corresponding to the to-be-written data; querying, with the view service node by each secondary node of the caching partition corresponding to the to-be-written data, view information of the caching partition corresponding to the to-be-written data; receiving, by each secondary node of the caching partition corresponding to the to-be-written data, the view information that is of the caching partition corresponding to the to-be-written data and that is returned by the view service node, where the view information further includes a primary-partition switching quantity of the caching partition corresponding to the to-be-written data; verifying, by each secondary node of the caching partition corresponding to the to-be-written data, that a primary-partition switching quantity that is of the caching partition corresponding to the to-be-written data and that is carried in the write request is consistent with the primary-partition switching quantity that is of the caching partition corresponding to the to-be-written data and that is included in the view information; verifying, by each secondary node of the caching partition corresponding to the to-be-written data, that the operation sequence number in the entry is consistent with an expected operation sequence number; and writing, by each secondary node of the caching partition corresponding to the to-be-written data, the data into a local write-back cache according to the operation sequence number and the operation parameter that are included in the entry.

It can be learned from the foregoing that after receiving the write request and the entry sent by the primary node, each secondary node of the caching partition first needs to verify consistency of the primary-partition switching quantities and consistency of the operation sequence numbers, so as to ensure accuracy of node operations and proper ordering of write request operations.

In a possible design, a maximum consecutive committed operation sequence number of each partition on each storage node is recorded on the node; the maximum consecutive committed operation sequence number indicates that all write operations corresponding to sequence numbers less than this sequence number have been copied to all secondary nodes; and after the primary node determines that all secondary nodes have completed data copying, the method further includes determining that execution of all write requests whose sequence number is less than the sequence number are completed, and updating the maximum consecutive committed operation sequence number; notifying, by the primary node, all secondary nodes of the updated maximum consecutive committed operation sequence number;

and reclaiming and releasing, by the primary node and all secondary nodes, the entry according to the maximum consecutive committed operation sequence number.

In a possible design, the method further includes determining, by the primary node, that flushing is required; selecting a dirty data block that needs to be flushed; marking a state of the selected data block as a flushing state; combining data blocks that can be simultaneously flushed; reading, from the local write-back cache, data of the data block that needs to be flushed; and writing the data back to a corresponding shared storage device.

In a possible design, the method further includes, when receiving a write request in a flushing procedure, determining, by the primary node, whether a to-be-written data block is in the flushing state; and if determining that the to-be-written data block is in the flushing state, suspending the write request, and processing the write request after flushing ends; or if determining that the to-be-written data block is not in the flushing state, performing a corresponding write operation according to the write request.

In a possible design, the method further includes determining, by the primary node, that local flushing has succeeded; sending a flushing request to all secondary nodes, and synchronizing an address of a flushed data block to all secondary nodes; and deleting, by the secondary node, data with the corresponding address from the local cache after receiving the flushing request.

In a possible design, the method further includes, after completing data deletion, returning, by the secondary node, an operation result to the primary node; and after flushing is successfully performed on all secondary nodes, changing, by the primary node, a state of a dirty data block in the local cache into a clean state.

In a possible design, the method further includes, if available space of the write-back cache is less than a threshold, determining that caching space needs to be reclaimed; selecting, according to a replacement algorithm, a data block that is in the clean state; deleting data of the data block; and reclaiming the data block, and changing the state of the data block into an available state.

In a possible design, the method further includes, if the view service node determines that a current primary node of a second caching partition is faulty, selecting, by the view service node, a new primary node for the second caching partition, updating view information of the second caching partition, and pushing the updated view information to the primary node and each secondary node of the second caching partition; after determining, according to the updated view information, that the new primary node is the primary node of the second caching partition, starting, by the new primary node selected for the second caching partition, a primary-node switching synchronization procedure of the primary node, and suspending all new modification services of the second caching partition; and determining, by each secondary node of the second caching partition according to the updated view information, that the primary node of the second caching partition is updated, and starting a primary-node switching synchronization procedure of the secondary node.

It can be learned from the foregoing that when a primary node of a caching partition is faulty, using a view update procedure of the view service node, a primary-node switching synchronization procedure of a primary node, and a primary-node switching synchronization procedure of a secondary node, continuity and reliability of a caching service can be ensured, and service interruption can be avoided.

In a possible design, starting, by each secondary node, the primary-node switching synchronization procedure of the secondary node after learning that the primary node of the caching partition is switched includes sending, by the secondary node, a maximum operation sequence number of the secondary node to the new primary node; finding, by the new primary node, a maximum common request sequence number of the new primary node and the secondary node, and sending, to the secondary node, the common request sequence number of the new primary node and the secondary node and all entries whose sequence number is greater than the common request sequence number; and calculating, by the secondary node, a set of differential entries, rolling back an entry that the secondary node has but the new primary node does not have, and catching up with an entry that the secondary node does not have but the new primary node has.

In a possible design, the calculating, by the secondary node, a set of differential entries, rolling back an entry that the secondary node has but the new primary node does not have, and catching up with an entry that the secondary node does not have but the new primary node has includes traversing, by the secondary node in a reversed order, a set of all entries that need to be rolled back, sequentially reading, from the primary node, data corresponding to the entries, and overwriting a local write-back cache; and traversing, by the secondary node in a positive order, a set of all entries that need to be caught up with, sequentially reading, from the primary node, data corresponding to the entries, and overwriting the local write-back cache.

In a possible design, the method further includes, after the secondary node processes all differential entries, notifying, by the secondary node, the new primary node that primary-node switching synchronization is successfully completed; and after obtaining a response indicating that primary-node switching synchronization of all secondary nodes is completed, determining, by the new primary node, that the primary-node switching procedure is completed, and starting to process a new service of the partition.

In a possible design, the method further includes, when a secondary node is restarted after a fault of the secondary node is removed, querying, by the secondary node with the view service node, partition information of the secondary node, or actively pushing, by the view service node, partition information of the secondary node; and performing, by the secondary node, data synchronization with the primary node.

In a possible design, the performing, by the secondary node, data synchronization with the primary node includes deleting, by the secondary node, cached data of a partition on which data overwriting needs to be performed, and sending, by the secondary node, a data overwriting request to the primary node; and returning, by the primary node, a maximum request sequence number of the primary node to the secondary node; starting, by the primary node, a flushing procedure; and flushing all dirty data whose sequence number is less than or equal to the request sequence number.

In a possible design, the method further includes, if the primary node receives a new write request in the flushing procedure and a to-be-written data block in the write request is not flushed, simultaneously executing, by the primary node, the write request locally, and forwarding the write request to all secondary nodes, where the corresponding data block does not need to be flushed in the data overwriting procedure.

In a possible design, the method further includes, after all dirty data blocks, on the primary node, whose sequence numbers are less than the request sequence number are successfully flushed, notifying, by the primary node, the secondary node that data synchronization is completed; notifying, by the primary node, the view service node that a fault of the partition of the secondary node is successfully removed; and updating, by the view service node, a view, and pushing the view to all related nodes.

In a possible design, the performing, by the secondary node, data synchronization with the primary node includes sending, by the secondary node, a maximum operation sequence number of the secondary node to the primary node; performing, by the primary node, a data overwriting procedure if the primary node does not find a common operation sequence number of the primary node and the secondary node; or if the primary node finds a maximum common operation sequence number of the primary node and the secondary node, sending, by the primary node to the secondary node, the common operation sequence number of the primary node and the secondary node and all entries whose sequence number is greater than the common operation sequence number; and calculating, by the secondary node, a set of differential entries, rolling back an entry that the secondary node has but the new primary node does not have, and catching up with an entry that the secondary node does not have but the new primary node has.

According to another aspect, a caching system based on a cache cluster is provided, where the system includes a cache cluster and a caching client; the cache cluster includes a view service node and multiple storage nodes, each storage node includes at least one write-back caching device, each write-back caching device includes multiple sub-partitions, a plurality of the sub-partitions forms one caching partition, each caching partition includes one primary sub-partition and at least one secondary sub-partition, the view service node is configured to record view information of each caching partition, the view information includes node information of a caching device in which each sub-partition included in each caching partition is located, a storage node in which a primary sub-partition of a first caching partition is located is a primary node of the first caching partition, a storage node in which each secondary sub-partition of the first caching partition is located is a secondary node of the first caching partition, and the first caching partition is any caching partition in the cache cluster; the caching client is configured to determine a partition number of a caching partition corresponding to to-be-written data; query, with the view service node according to the partition number of the caching partition corresponding to the to-be-written data, primary node information of the caching partition corresponding to the to-be-written data; receive the primary node information that is of the caching partition corresponding to the to-be-written data and that is returned by the view service node; and send, according to the primary node information of the caching partition corresponding to the to-be-written data, a write request to a primary node of the caching partition corresponding to the to-be-written data, where the write request carries the to-be-written data; and the primary node of the caching partition corresponding to the to-be-written data is configured to write the to-be-written data into a local write-back cache according to the write request; obtain information about each secondary node of the caching partition corresponding to the to-be-written data from the view service node; and copy the to-be-written data to each secondary node of the caching partition corresponding to the to-be-written data.

In a possible design, the primary node of the caching partition corresponding to the to-be-written data is further configured to, before writing the to-be-written data into the local write-back cache according to the write request, query, with the view service node, view information of the caching partition corresponding to the to-be-written data, and determine, according to the view information of the caching partition corresponding to the to-be-written data, that the primary node itself is the primary node of the caching partition corresponding to the to-be-written data.

In a possible design, the view information further includes a primary-partition switching quantity of the caching partition corresponding to the to-be-written data; and the primary node of the caching partition corresponding to the to-be-written data is further configured to, after determining, according to the view information of the caching partition corresponding to the to-be-written data, that the primary node itself is the primary node of the caching partition corresponding to the to-be-written data, verify that a primary-partition switching quantity that is of the caching partition corresponding to the to-be-written data and that is carried in the write request is consistent with the primary-partition switching quantity that is carried in the view information of the caching partition corresponding to the to-be-written data.

In a possible design, the primary node of the caching partition corresponding to the to-be-written data is further configured to generate an entry of the to-be-written data according to the write request, where the entry includes an operation sequence number and an operation parameter, and write the to-be-written data into the local write-back cache according to the operation sequence number and the operation parameter that are included in the entry.

In a possible design, the primary node of the caching partition corresponding to the to-be-written data is further configured to send the write request and the entry to each secondary node of the caching partition corresponding to the to-be-written data; and each secondary node of the caching partition corresponding to the to-be-written data is configured to query, with the view service node, view information of the caching partition corresponding to the to-be-written data; receive the view information that is of the caching partition corresponding to the to-be-written data and that is returned by the view service node, where the view information further includes a primary-partition switching quantity of the caching partition corresponding to the to-be-written data; verify that a primary-partition switching quantity that is of the caching partition corresponding to the to-be-written data and that is carried in the write request is consistent with the primary-partition switching quantity that is of the caching partition corresponding to the to-be-written data and that is included in the view information; verify that the operation sequence number in the entry is consistent with an expected operation sequence number; and write the data into a local write-back cache according to the operation sequence number and the operation parameter that are included in the entry.

In a possible design, the view service node is configured to, after determining that a current primary node of a second caching partition is faulty, select a new primary node for the second caching partition, update view information of the second caching partition, and push the updated view information to the primary node and each secondary node of the second caching partition; the new primary node selected for the second caching partition is configured to, after determining, according to the updated view information, that the new primary node is the primary node of the second caching partition, start a primary-node switching synchronization procedure of the primary node, and suspend all new modification services of the second caching partition; and each secondary node of the second caching partition is configured to determine, according to the updated view information, that the primary node of the second caching partition is updated, and start a primary-node switching synchronization procedure of the secondary node.

According to another aspect, an embodiment of the present disclosure provides a caching client. The caching client has a function of implementing behavior of a caching client in the foregoing method design. The function may be implemented by hardware, or may be implemented by executing corresponding software by hardware. The hardware or the software includes one or more modules corresponding to the function.

In a possible design, a structure of the caching client includes a processor, a receiver, and a transmitter. The processor is configured to support the caching client in performing a corresponding function in the foregoing method. The receiver is configured to support communication between the caching client and each of a storage node and a view service node, and receive information or an instruction that is used in the foregoing method and is sent by the storage node and the view service node. The transmitter is configured to support communication between the caching client and each of the storage node and the view service node, and send, to the storage node and the view service node, information or an instruction that is used in the foregoing method. The caching client may further include a memory. The memory is configured to couple with the processor, and the memory stores a program instruction and data necessary for the caching client.

According to still another aspect, an embodiment of the present disclosure provides a storage node. The storage node has a function of implementing behavior of a primary node or a secondary node of a caching partition in the foregoing method design. The function may be implemented by hardware, or may be implemented by executing corresponding software by hardware. The hardware or the software includes one or more modules corresponding to the function. The module may be software and/or hardware.

In a possible, design, a structure of the storage node includes a transmitter, a receiver, and a processor. The transmitter and the receiver are configured to support communication between the storage node and each of another storage node, a caching client, and a view service node. The receiver is configured to support the storage node in receiving various instructions such as a write request sent by the foregoing caching client. The processor controls the storage node to perform a write operation according to the write request received by the receiver.

According to still another aspect, an embodiment of the present disclosure provides a view service node. The view service node has a function of implementing behavior of a view service node in the foregoing method design. The function may be implemented by hardware, or may be implemented by executing corresponding software by hardware. The hardware or the software includes one or more modules corresponding to the function. The module may be software and/or hardware.

In a possible design, a structure of the view service node includes a transmitter, a receiver, and a processor. The transmitter and the receiver are configured to support communication between the view service node and each of a storage node and a caching client. The receiver is configured to support the view service node in receiving various instructions such as a view query sent by the foregoing caching client or the storage node. The processor controls the view service node to perform operations such as a view update.

According to yet another aspect, an embodiment of the present disclosure provides a computer storage medium configured to store a computer software instruction used by the foregoing caching client. When executing the computer instruction, the caching client executes the caching method provided in the foregoing aspect.

According to yet another aspect, an embodiment of the present disclosure provides a computer storage medium configured to store a computer software instruction used by the foregoing storage node. When executing the computer instruction, the storage node executes the caching method provided in the foregoing aspect.

According to yet another aspect, an embodiment of the present disclosure provides a computer storage medium configured to store a computer software instruction that is used by the foregoing view service node and that includes a program designed for executing the foregoing aspect.

Compared with the prior art, in the embodiments of the present disclosure, multiple duplicates are established on a primary node and a secondary node of a caching partition, so that a reliability requirement of a large-scale cluster can be met. In addition, using a view service node that stores partition information, there is a possibility of switching between the primary node and the secondary node, so that flexibility is high.

DESCRIPTION OF EMBODIMENTS

The technical solutions of the present disclosure are further described in detail with reference to accompanying drawings and embodiments as follows.

To make the purpose, technical solutions, and advantages of the embodiments of the present disclosure clearer, the following clearly describes the technical solutions of the embodiments of the present disclosure with reference to the accompanying drawings in the embodiments of the present disclosure.

The present disclosure provides a caching method and system based on a cache cluster, so as to implement high consistency of multiple duplicates in a large-scale distributed write-back cache, so that a reliability requirement and an availability requirement of a large-scale cluster can be met. The present disclosure is further applied to a wide range of application scenarios, and may be applied to a conventional multi-control array, a server storage area network (Server SAN), a distributed file system, a distributed database, and a write-back caching acceleration scenario in another distributed storage system.

Figure 1A:
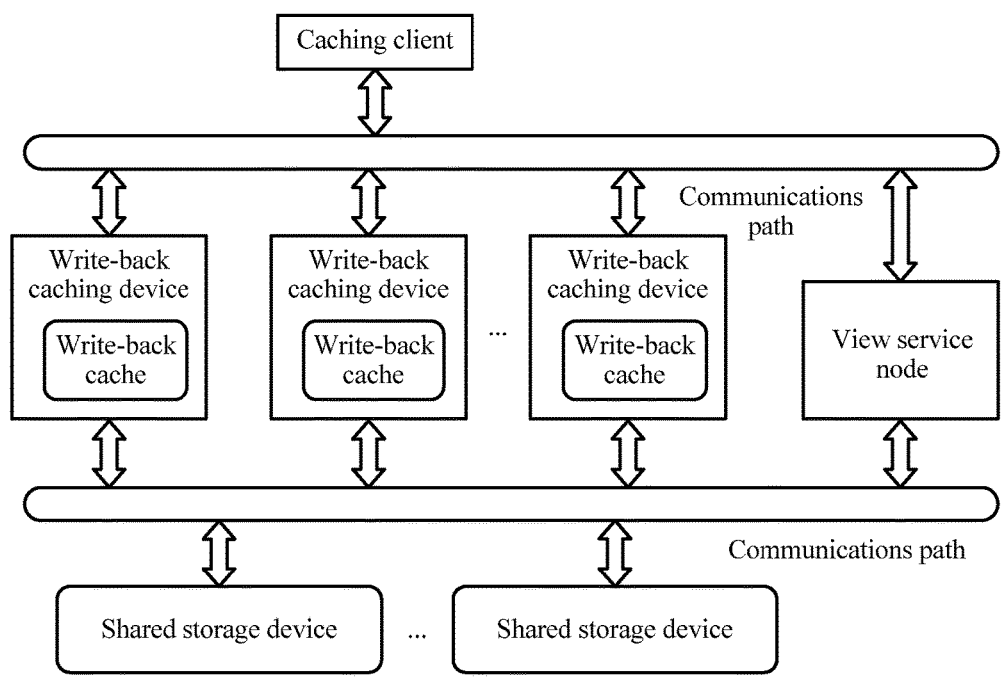
FIG. 1A is a schematic diagram of a system architecture on which a caching method provided in embodiments of the present disclosure is based.

FIG. 1A is a schematic diagram of a system architecture of a cache cluster on which a caching method provided in embodiments of the present disclosure is based. The cache cluster includes multiple write-back caching devices, multiple shared storage devices, and at least one view service node. A connection may be established between a caching client and the write-back caching device, between the caching client and the view service node, between the shared storage device and the write-back caching device, and between the write-back caching device and the view service node using a communications network. The write-back caching device may be a non-volatile storage device such as a solid-state drive (SSD) disk or a flash disk. The shared storage device may be a hardware disk.

Figure 1B:
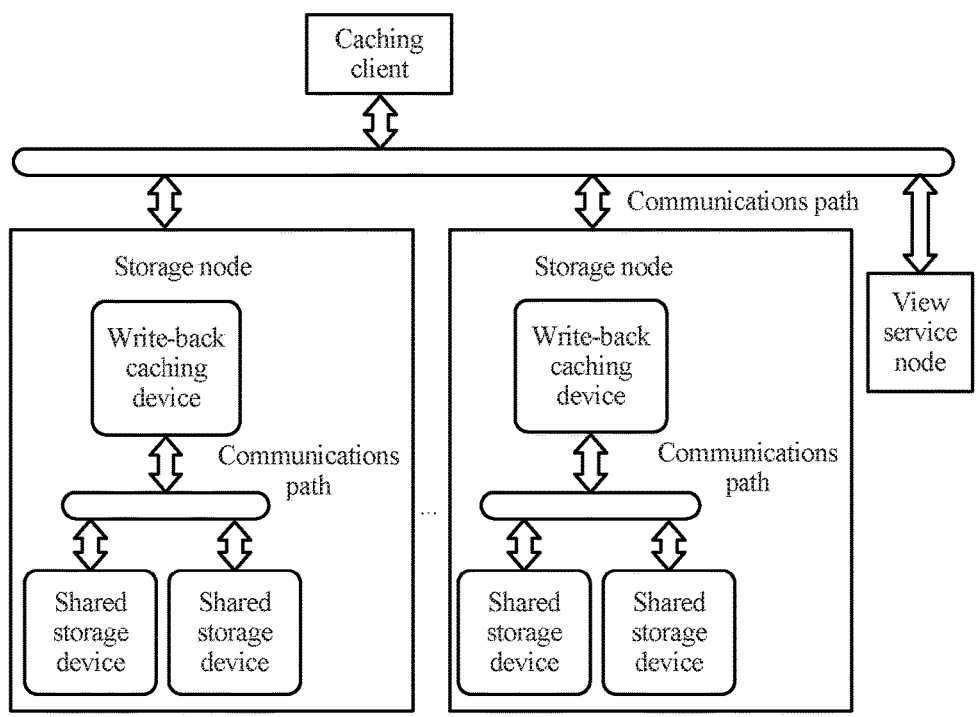
FIG. 1B is a schematic diagram of another system architecture on which the caching method provided in embodiments of the present disclosure is based.
Figure 1C:
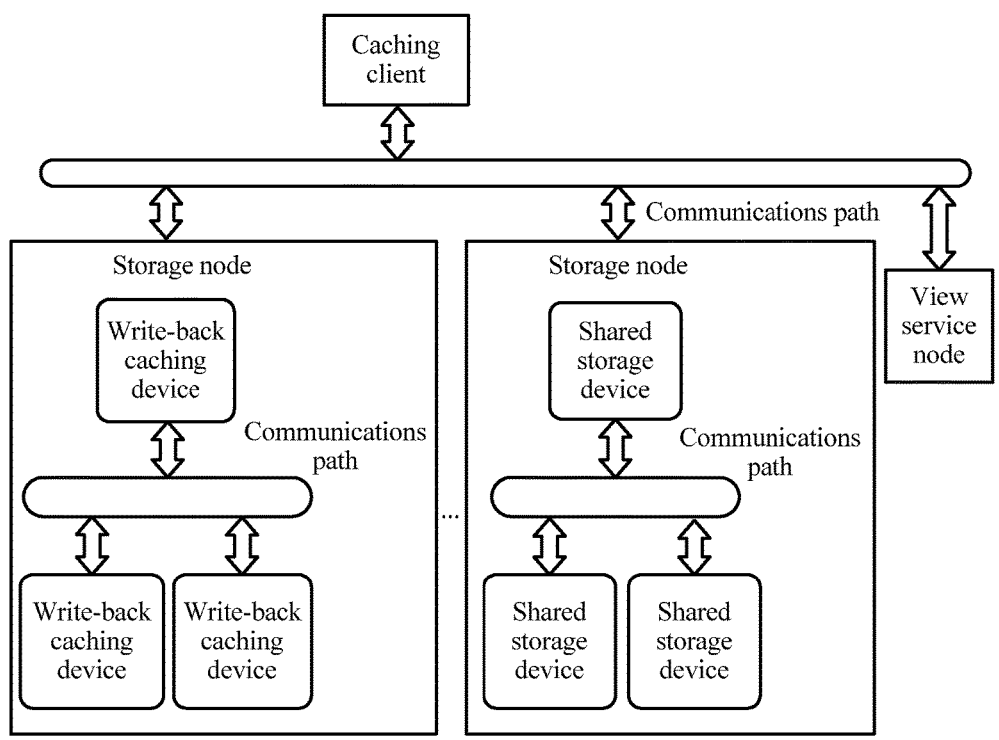
FIG. 1C is a schematic diagram of another system architecture on which the caching method provided in embodiments of the present disclosure is based.

FIG. 1B and FIG. 1C are schematic diagrams of two other system architectures of a cache cluster on which the caching method provided in embodiments of the present disclosure is based. In the two system architectures, the cache cluster includes a view service node and multiple storage nodes. FIG. 1B is a system architecture in which a write-back caching device and a shared storage device are integrated on one storage node. For example, one storage node includes one write-back caching device and multiple shared storage devices. FIG. 1C is a system architecture in which the write-back caching device and the shared storage device are separated on different storage nodes. For example, one storage node is for deploying only the write-back caching device, and another storage node is for deploying only the shared storage device. A connection may be established between a caching client and the write-back caching device, between the caching client and the view service node, between the shared storage device and the write-back caching device, and between the write-back caching device and the view service node using a communications path. The shared storage device uses a non-volatile storage medium such as a magnetic disk. A type of a medium of the write-back caching device is not limited, and may be a volatile storage medium or a non-volatile storage medium.

The view service node in the system is responsible for services such as querying, changing, and pushing a data arrangement view of a write-back cache, and for monitoring a status of a storage node on which the write-back caching device is located. The storage node periodically sends a heartbeat to the view service node. The write-back caching device caches data that is to be written into the shared storage device. Dirty data in the write-back caching device is periodically flushed into the shared storage device. The dirty data is data that has been updated in a cache but is not written into the shared storage device. The caching client is a user of a caching service, and the caching client and the write-back caching device may be deployed on one storage node, or may be deployed separately. The caching client and the storage node may be interconnected using a network.

The caching client, the write-back caching device, and the view service node each may be deployed as an independent server, or may be integrated into an existing device as modules.

Figure 2:
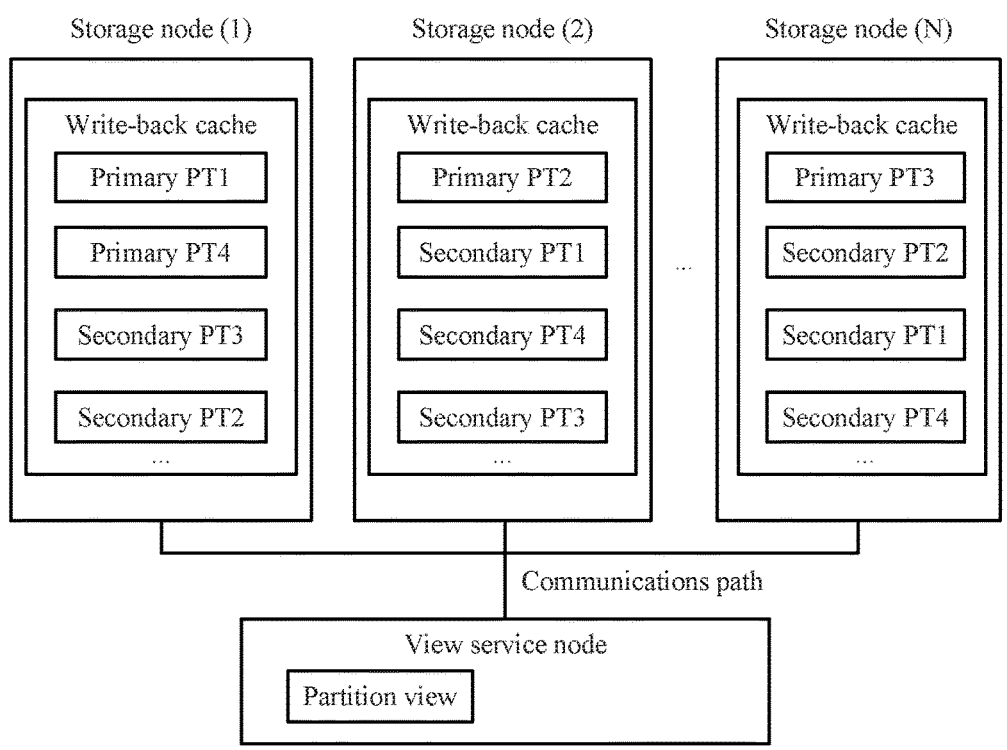
FIG. 2 is a schematic diagram of a caching partition according to an embodiment of the present disclosure.

To improve reliability of data in a write-back cache and increase a write speed, in the present disclosure, the write-back cache is managed by means of logical partitioning, and is further managed using a view service node. FIG. 2 is a schematic diagram of a caching partition according to an embodiment of the present disclosure. Referring to FIG. 2, each write-back caching device is divided into a number of sub-partitions logically or physically. The view service node groups all the sub-partitions in a cache cluster into a number of caching partitions (PT) according to a specific requirement using a data arrangement algorithm. In one embodiment, the sub-partitions may be grouped into a number of PTs according to a duplicate quantity, a reliability requirement, balancing, and the like. In addition, a location (for example, node information of a caching device in which each sub-partition is located), a health status, and the like of each sub-partition in all the caching partitions are recorded on the view service node, and are pushed to all storage nodes using a communications path. A data structure or storage space in which information such as a location and a health status of a partition is recorded is also referred to as a partition view or a view in this embodiment of the present disclosure.

All sub-partitions in one caching partition generally come from two or more write-back caching devices. Preferably, all sub-partitions in one caching partition come from different write-back caching devices.

One caching partition includes one primary sub-partition and a number of secondary sub-partitions. Attribute information of each sub-partition is also recorded in the foregoing partition view. The attribute information is used to indicate whether the sub-partition is a primary sub-partition or a secondary sub-partition. All data written into the caching partition is sent to a storage node in which the primary sub-partition is located. A storage node in which a primary sub-partition of one caching partition is located is referred to as a primary node of the caching partition. The primary node is responsible for copying written data to storage nodes in which all secondary sub-partitions are located. A storage node in which a secondary sub-partition of one caching partition is located is referred to as a secondary node of the caching partition, so as to maintain multiple duplicates of written data.

A storage node may be a primary node or a secondary node. A storage node may be a primary node for a caching partition, but the storage node may be a secondary node for another caching partition.

An attribute of each caching partition includes an ioviewid and a ptviewid, and initial values of the ioviewid and the ptviewid may be specified (for example, as 0 or 1). When a primary sub partition of the partition is switched, the ioviewid accumulates, and when a state of a secondary sub partition is switched, the ptviewid accumulates. The state is an operating (UP) state or a faulty (DOWN) state of the secondary sub-partition. State switching includes a switchover from UP to Down and a switchover from DOWN to UP.

Figure 3A:
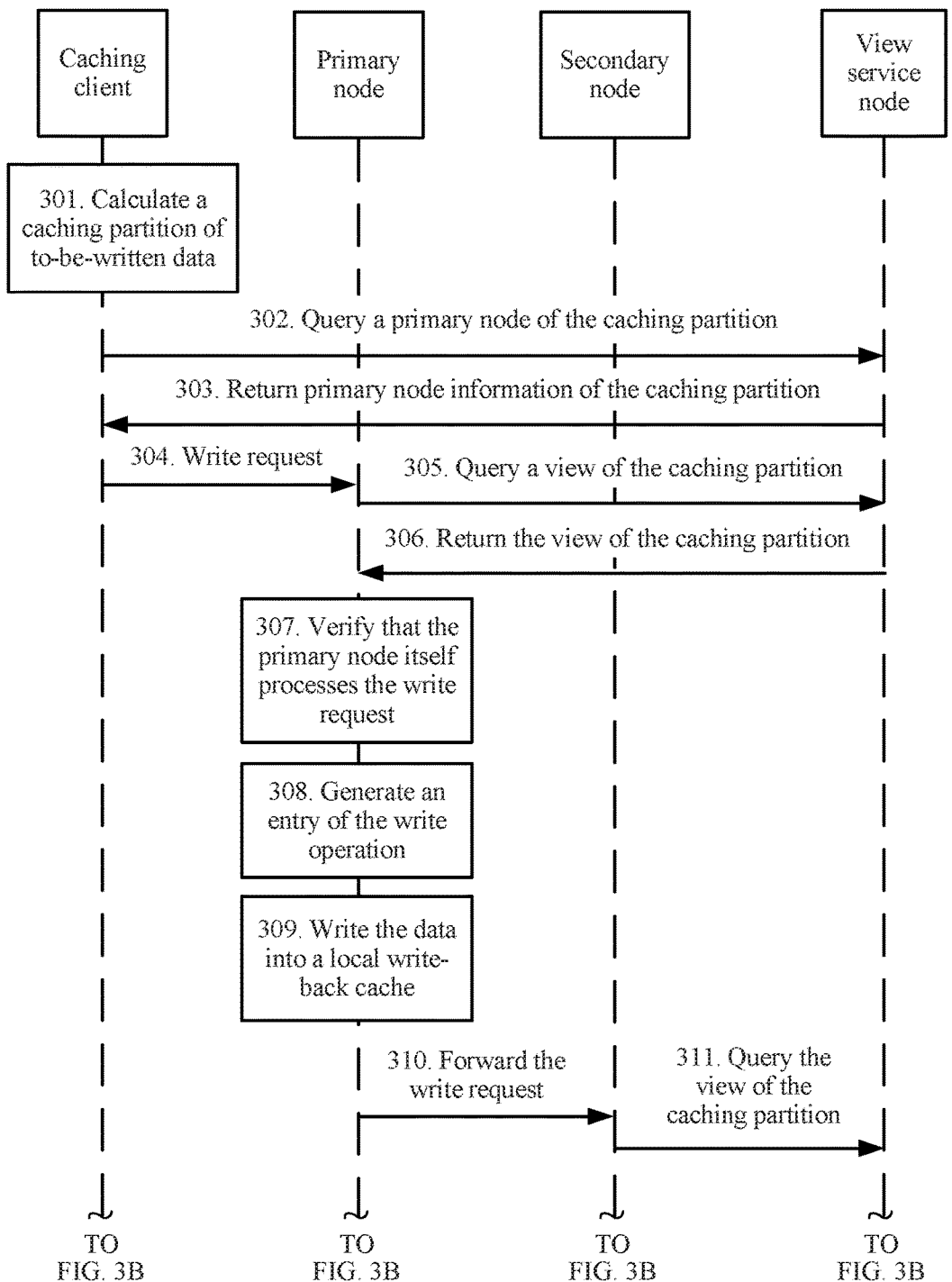
FIG. 3A and FIG. 3B are a signaling flowchart of a normal write operation included in the caching method provided in embodiments of the present disclosure is based.
Figure 3B:
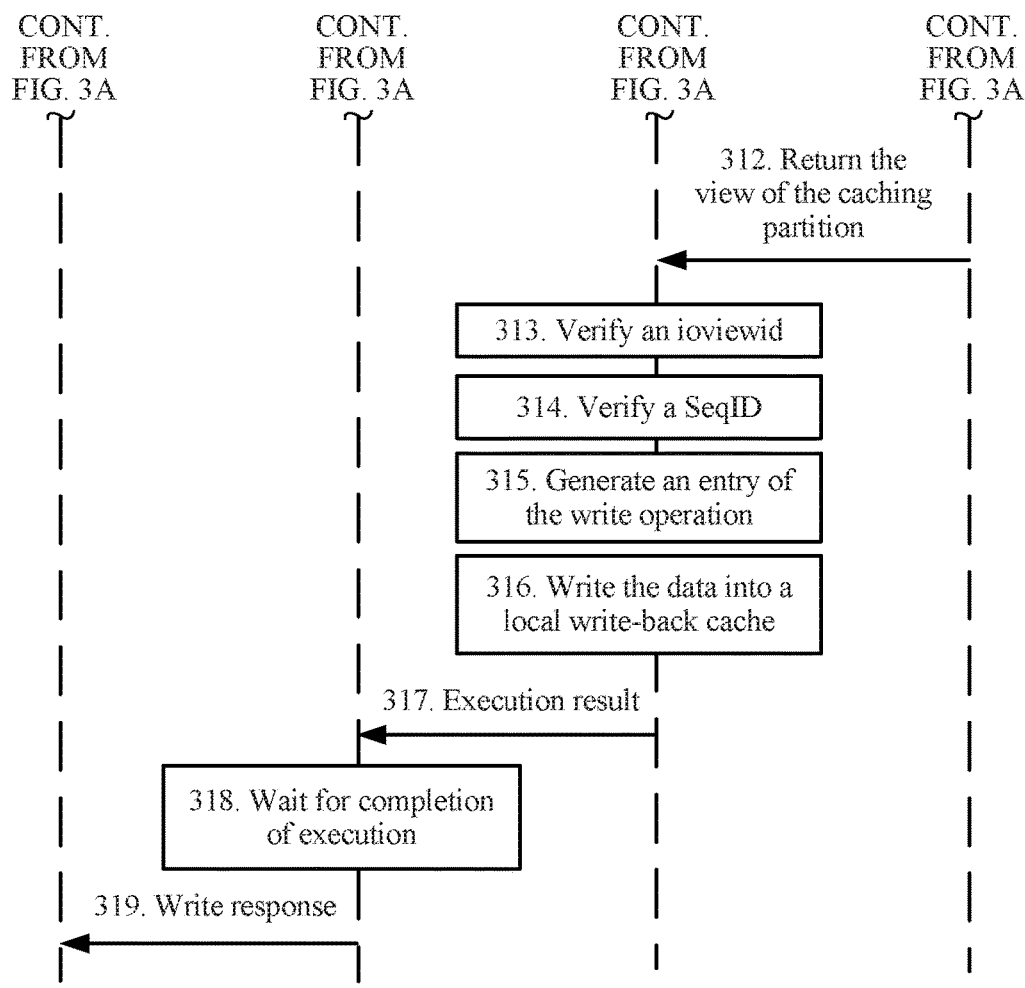

FIG. 3A and FIG. 3B are a signaling flowchart of a normal write operation included in the caching method provided in embodiments of the present disclosure. The method may be based on the system architecture shown in FIG. 1A, FIG. 1B, or FIG. 1C and the caching partition shown in FIG. 2. Referring to FIG. 3A and FIG. 3B, the method includes the following steps.

Step 301: A caching client obtains a partition number of a caching partition of to-be-written data.

In one embodiment, first, the to-be-written data may be segmented into data blocks of a fixed length, and next, the partition number of the caching partition of the to-be-written data is calculated according to addresses of the data blocks using a hash algorithm.

Step 302: The caching client sends a query request to a view service node, to query a storage node corresponding to a primary sub-partition of the caching partition, where the query request carries the partition number of the caching partition of the to-be-written data.

The foregoing storage node corresponding to the primary sub-partition of the caching partition is a primary node of the caching partition.

In this embodiment of the present disclosure, sub-partitions included in each caching partition and attribute information of each sub-partition are recorded in a partition view of the view service node. After calculating the partition number of the caching partition of the to-be-written data in step 301, the caching client may add the partition number of the caching partition into the query request, and send the query request to the view service node. The view service node determines, according to information recorded in the partition view, the storage node corresponding to the primary sub-partition of the caching partition.

Step 303: The view service node returns primary node information to the caching client.

The primary node information may include any one or more pieces of the following information: the partition number (ID), a partition state (UP/DOWN), an ioviewid, an ID of the node in which the primary sub partition is located, and an address and a port number of the primary sub partition.

In this embodiment of the present disclosure, the caching client may cache the primary node information.

Step 304: The caching client sends a write request to a primary node.

The write request carries the to-be-written data.

Step 305: After receiving the write request, the primary node sends a query request to the view service node, to query view information of the caching partition.

Step 305 is an optional step. If the primary node caches the view information of the caching partition, the primary node may not perform step 305. However, because the view information of the caching partition may be changed, if the primary node queries the view information of the caching partition after receiving the write request, the primary node can obtain newest view information.

In addition, step 305 may not be performed if the query request sent by the caching client to the view service node in step 302 is used to query the view information of the caching partition in addition to the storage node corresponding to the primary sub-partition of the caching partition, and if the caching client adds the view information of the caching partition into the write request when sending the write request to the primary node in step 304.

Step 306: The view service node returns the view information of the caching partition.

The view information of the partition includes any one or more of a location, a health status, or attribute information of each sub-partition. The attribute information is used to indicate whether the sub-partition is a primary sub-partition or a secondary sub-partition, and the location of the sub-partition indicates a caching device in which the sub-partition is located. The primary node may cache the view information.

Step 307: The primary node verifies that the primary node itself is a primary node into which data is to be written.

In one embodiment, it may be verified whether an ioviewid of the partition carried in the request is the same as an ioviewid of the partition cached by the primary node. If the ioviewids are the same, step 308 is performed; or if the ioviewids are different, step 305 is performed, so as to update the view information.

By verifying whether the ioviewids are the same, the primary node further verifies that the primary node itself is the primary node into which data is to be written, so that a case in which the primary node has been switched in a write request sending process is avoided. Verifying whether the ioviewids are the same may be used as a triggering condition for querying the view information.

Step 308: If ioviewids are the same, the primary node generates an entry for the write request, where the entry records an operation sequence number (SeqID), a parameter carried in the write request, and the like.

The operation sequence number includes a current ioviewid of the partition and an accumulative operation count (SeqNo). That the accumulative operation count is increased by one each time means that an accumulative operation count of a current write request is obtained by adding one to a value of an accumulative operation count of a previous write request.

The parameter carried in the write request is not limited in this embodiment of the present disclosure, and the parameter may be a name of a to-be-written file, a data length, and the like.

Step 309: The primary node writes the data into a local write-back cache according to the generated entry.

The local write-back cache is a write-back caching device of the primary node of the caching partition corresponding to the to-be-written data.

Step 310: The primary node forwards the write request (together with the entry) to all secondary nodes included in the view information returned in step 306.

Step 311: After receiving the write request forwarded by the primary node, the secondary node sends a query request to the view service node, to query the view information of the caching partition.

Step 311 is an optional step. If the write request received by the secondary node carries the view information of the caching partition, step 311 may not be performed.

Step 312: The view service node returns the view information of the partition.

The secondary node may cache the view information.

Step 313: The secondary node verifies, according to the view information, whether the ioviewid is expected.

In one embodiment, it may be verified whether the ioviewid of the partition carried in the request is the same as an ioviewid of the partition cached by the secondary node. If the ioviewids are the same, step 314 is performed; or if the ioviewids are different, step 311 is performed, so as to update the view information.

Step 314: The secondary node verifies whether the SeqID in the entry is expected.

The SeqID includes the current ioviewid of the partition and the SeqNo. That the accumulative operation count is increased by one each time means that an accumulative operation count of a current write request is obtained by adding one to a value of an accumulative operation count of a previous write request. In step 314, it is verified whether the SeqID in the entry meets the foregoing rule.

Step 315: If all the foregoing verifications succeed, the secondary node generates a local entry according to the entry sent in step 310, and records the entry into a local write-back cache in an SeqID order.

Step 316: The secondary node writes the data into the local write-back cache according to the received entry, and waits for completion of execution.

Step 317: The secondary node returns an execution result to the primary node after the local write-back cache completes the execution.

Step 318: The primary node waits for completion of execution by both the local write-back cache and each secondary node.

The primary node sets the entry to a committed state, and updates a maximum contiguous committed operation sequence number (lastCommittedSeqID) if necessary. The lastCommittedSeqID is defined as that all operations whose sequence number is less than or equal to the lastCommittedSeqID have been in the committed state.

Step 319: The primary node returns a response of the write request to the caching client.

In step 308, the primary node generates the entry for the write operation. The entry may record the to-be-written data in addition to the SeqID and the parameter carried in the write operation. In this case, step 309 may not be performed after step 308; instead, step 309 may be performed after the primary node determines that each secondary node has the entry.

In this embodiment of the present disclosure, entry reclaiming needs to be performed, to ensure that the entry does not occupy an excessive quantity of resources. In one embodiment, entry reclaiming may be performed using the following algorithm.

A lastCommittedSeqID of each partition is recorded on the primary node and the secondary node, and indicates that all operations whose sequence number is less than the SeqID have been copied to all secondary sub-partitions. In a process in which the primary node processes a write request, it is assumed that an SeqID of the write request is a CurrentSeqID, and when learning that both the local write-back cache and each secondary node complete execution, the primary node attempts to update the lastCommittedSeqID. If execution of all write requests whose SeqID is less than the CurrentSeqID is not completed, the primary node does not update the lastCommittedSeqID; or if execution of all write requests whose SeqID is less than the CurrentSeqID is completed, the primary node finds a maximum new_lastCommittedSeqID, and execution of all write operations whose sequence number is less than the new_lastCommittedSeqID has been completed. The lastCommittedSeqID is updated to the new_lastCommittedSeqID.

After the lastCommittedSeqID on the primary node is updated, the new lastCommittedSeqID is notified to the secondary node. This notification may be carried in a normal write operation and a normal flushing operation copy procedure.

Any entry whose SeqID is less than the lastCommittedSeqID may be reclaimed and released.

A normal flushing procedure is responsible for flushing, into a shared storage device, dirty data that is written into the write-back caching device in a write procedure. The write procedure and a flushing procedure work cooperatively, so as to ensure that data is finally written into the shared storage device.

Figure 4A:
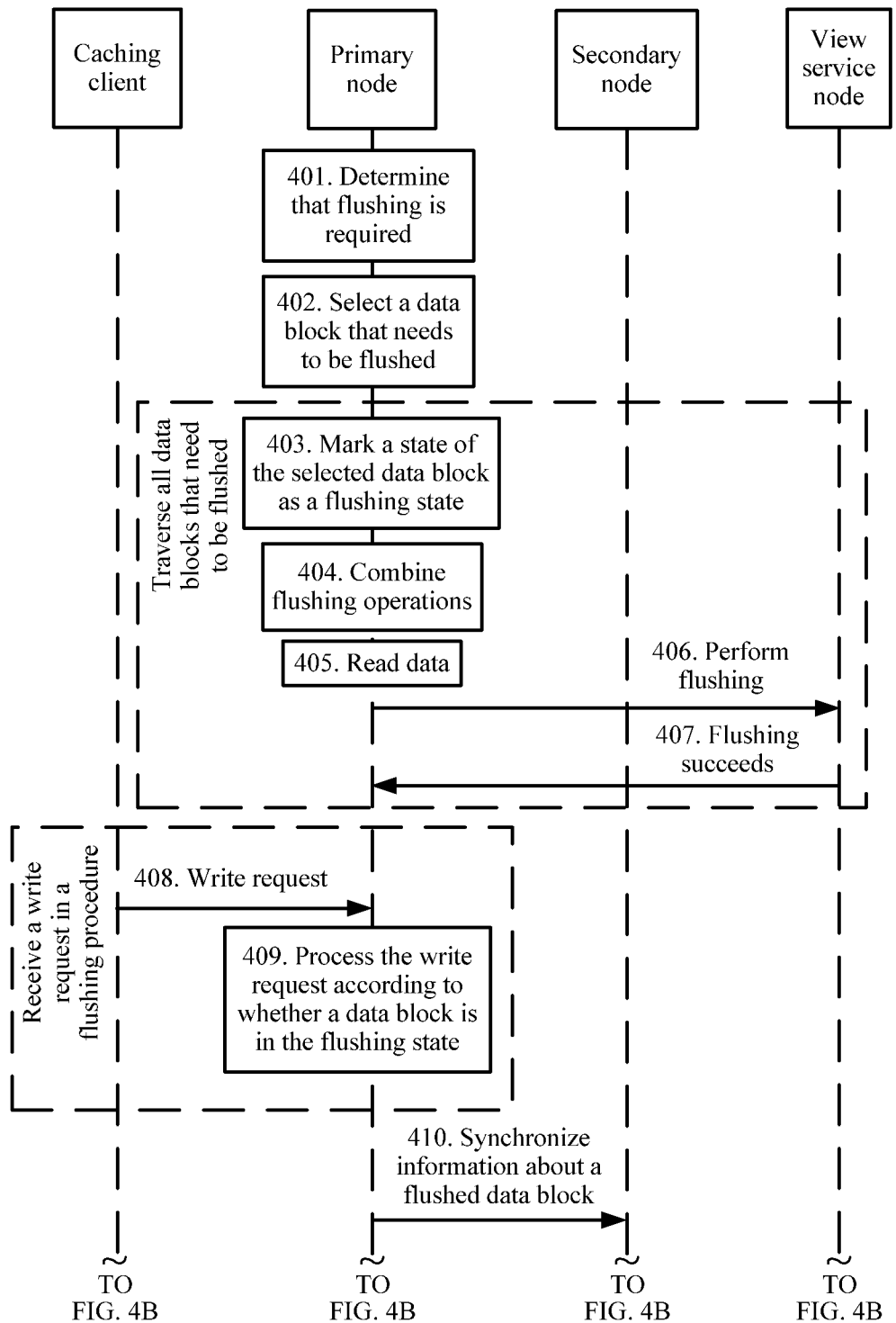
FIG. 4A and FIG. 4B are a signaling flowchart of a normal flushing procedure included in the caching method provided in embodiments of the present disclosure.
Figure 4B:
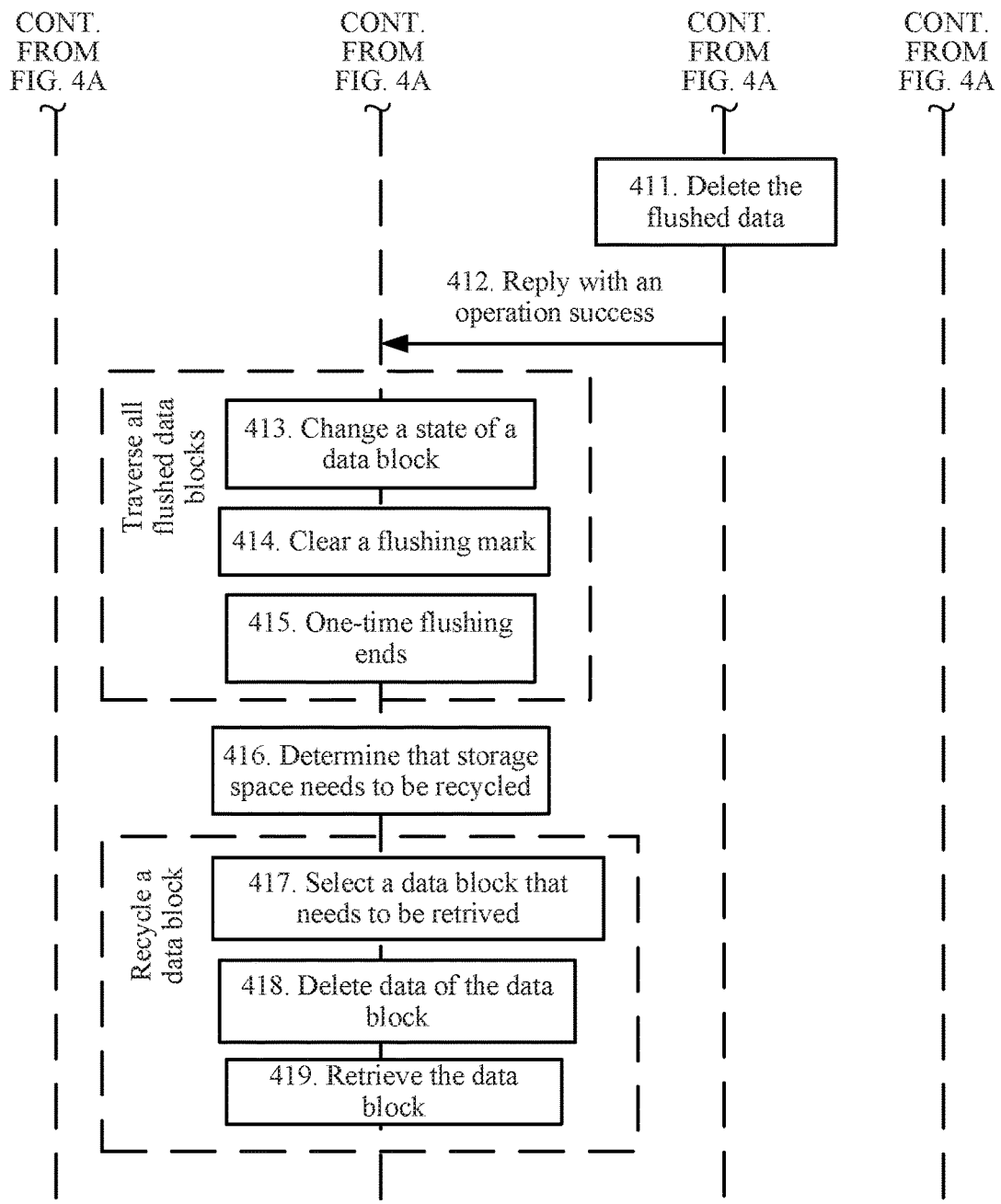

FIG. 4A and FIG. 4B are a signaling flowchart of a normal flushing procedure included in the caching method provided in embodiments of the present disclosure. Referring to FIG. 4A and FIG. 4B, the method includes the following steps.

Step 401: Trigger a flushing procedure when it is determined, using a flushing algorithm, that flushing is required.

In one embodiment, a method for determining that flushing is required may be but is not limited to the following methods. Flushing is performed if a total amount of dirty data exceeds a threshold; or all data needs to be forcibly flushed; or all data of a partition needs to be flushed; or data may be flushed when a system is idle.

Step 402: A primary node selects a specific quantity of dirty data blocks that need to be flushed.

Step 403: The primary node marks, as a flushing state, a state of the selected data block that needs to be flushed.

Step 404: Combine data blocks that can be simultaneously flushed.

In one embodiment, data of data blocks whose addresses are contiguous on a shared storage device may be read and then combined into one flushing request, and then the flushing request is sent to the shared storage device.

Step 405: Read, from a local write-back cache, data of a data block that needs to be flushed.

Step 406: Write the data back to a corresponding shared storage device.

Step 407: The shared storage device returns a result after data writing is completed.

Step 408: Receive a write request in the flushing procedure.

Step 409: In the flushing procedure, the primary node may continue to process a read/write service; after receiving the write request, first determines whether the write request conflicts with data that is being flushed; and if a to-be-written data block is in the flushing (flushing) state, suspends the write request, and processes the write request after flushing is completed; or if a to-be-written data block is not in the flushing state, processes the write request in a same manner as in a normal write procedure.

Step 410: After local flushing succeeds, send a flushing request to all secondary nodes, and synchronize an address of a flushed data block to all secondary nodes.

Step 411: The secondary node deletes data with the corresponding address from a local cache after receiving the flushing request.

In one embodiment, a mark deletion technology may be used to delete the data with the corresponding address from the local cache.

Step 412: Return an operation result to the primary node after data deletion is completed.

Step 413: After flushing is successfully performed on each secondary node, the primary node changes a state of a corresponding dirty data block in the local cache into a clean (clean) state, and makes the state persistent.

Step 414: Clear a flushing mark of a corresponding data block.

Step 415: Determine that one-time flushing successfully ends.

This embodiment of the present disclosure may further include the following background data block reclaiming procedure.

Step 416: If available space of a write-back caching device is less than a threshold, determine that caching space needs to be reclaimed.

Step 417: Select, according to a replacement algorithm, a data block that is in the clean state.

Step 418: Delete data of the data block.

Step 419: Reclaim the data block, and change the state of the data block into an available state.

The caching method provided in this embodiment of the present disclosure may further include a primary-node switching procedure. After a primary node of a partition is faulty, the primary node stops sending a heartbeat to a view service node. After the view service node does not receive a given number of heartbeats of the primary node, the view service node determines that the primary node is faulty, and then the view service node needs to select one secondary node from secondary nodes and update the secondary node to the primary node, and pushes an updated view to both the related primary node and the related secondary node. In the primary-node switching procedure, an entry on each of the new primary node and the secondary node exists, and it is ensured, using a lastCommittedSeqID, that the new primary node and the secondary node definitely have a common SeqID. Therefore, fast data synchronization may be performed using the entry.

Figure 5:
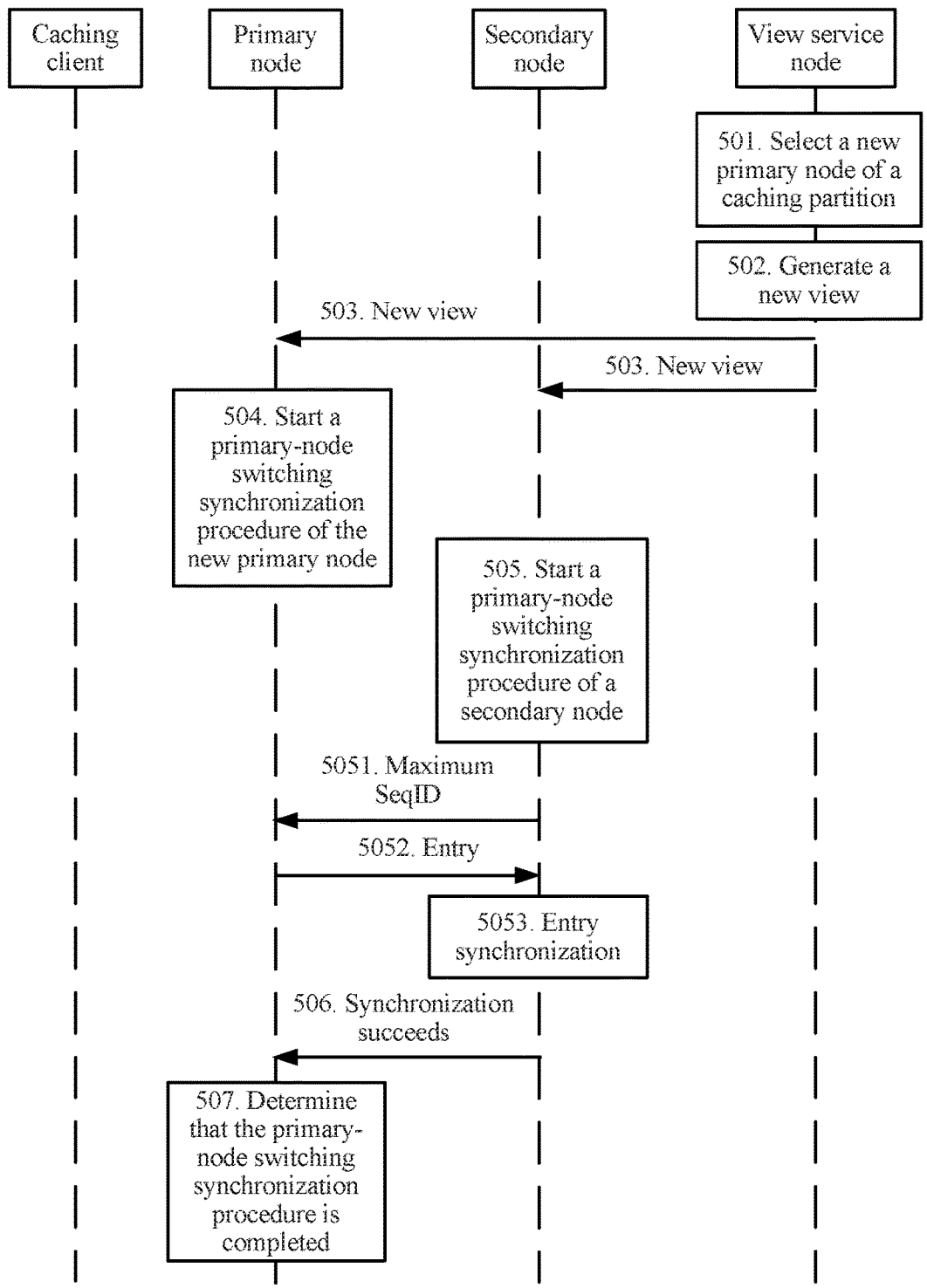
FIG. 5 is a signaling flowchart of a primary-node switching procedure included in the caching method provided in embodiments of the present disclosure.

FIG. 5 is a signaling flowchart of a primary-node switching procedure included in a caching method according to an embodiment of the present disclosure. Referring to FIG. 5, the method includes the following steps.

Step 501: A view service node determines that a current primary node of a caching partition is faulty, and selects a new primary node.

Step 502: The view service node generates a new view.

Step 503: The view service node pushes the new view to both the primary node and a secondary node of the partition.

Step 504: After calculating, according to the view, that the new primary node itself is the new primary node, the new primary node starts a primary-node switching synchronization procedure of the new primary node, and suspends all new modification services of the partition.

Step 505: Each secondary node starts a primary-node switching synchronization procedure of the secondary node after learning, according to the view, that the primary node is switched.

The primary-node switching synchronization procedure of the secondary node mainly includes the following steps.

Step 5051: The secondary node sends a maximum SeqID of the secondary node to the new primary node.

Step 5052: The new primary node finds a maximum common SeqID of the new primary node and the secondary node, and sends, to the secondary node, the common SeqID of the new primary node and the secondary node and each entry whose sequence number is greater than the common SeqID.

Step 5053: The secondary node calculates a set of differential entries, rolls back an entry that the secondary node has but the new primary node does not have, and catches up with an entry that the secondary node does not have but the new primary node has.

The secondary node traverses, in a reversed order (a descending order of SeqIDs), a set of all entries that need to be rolled back, sequentially reads, from the primary node, data corresponding to the entry, and overwrites a local write-back cache.

The secondary node traverses, in a positive order (an ascending order of SeqIDs), a set of all entries that need to be caught up, sequentially reads, from the primary node, data corresponding to the entry, and overwrites the local write-back cache.

After the secondary node processes each differential entry, data of the secondary node is consistent with that of the primary node.

Step 506: The secondary node notifies the new primary node that primary-node switching synchronization is successfully completed.

Step 507: After obtaining a response indicating that primary-node switching synchronization of all secondary nodes is completed, the new primary node determines that the primary-node switching procedure is completed, and starts to process a new service of the partition.

The caching method provided in this embodiment of the present disclosure may further include a secondary-node fault removing procedure. When a secondary node is faulty, a primary node temporarily ignores the secondary node, and does not copy a new service to the secondary node. When a fault of the secondary node is removed, the secondary node needs to perform data synchronization with the primary node, so that data of the secondary node is consistent with that of the primary node.

An entry may be stored in a node in a persistent manner or a non-persistent manner. Secondary-node fault removing procedures corresponding to different storage manners are different. "Non-persistent" means that the entry does not need to be written into a non-volatile storage medium (for example, a flash or a magnetic disk), but is kept only in a volatile storage medium (for example, a random-access memory (RAM)).

The following first describes a secondary-node fault removing procedure existing when an entry is stored in a non-persistent manner. Because the entry is stored in the non-persistent manner, no entry exists after a fault of a secondary node is removed, and data synchronization between a primary node and the secondary node needs to be implemented by means of data overwriting.

Figure 6:
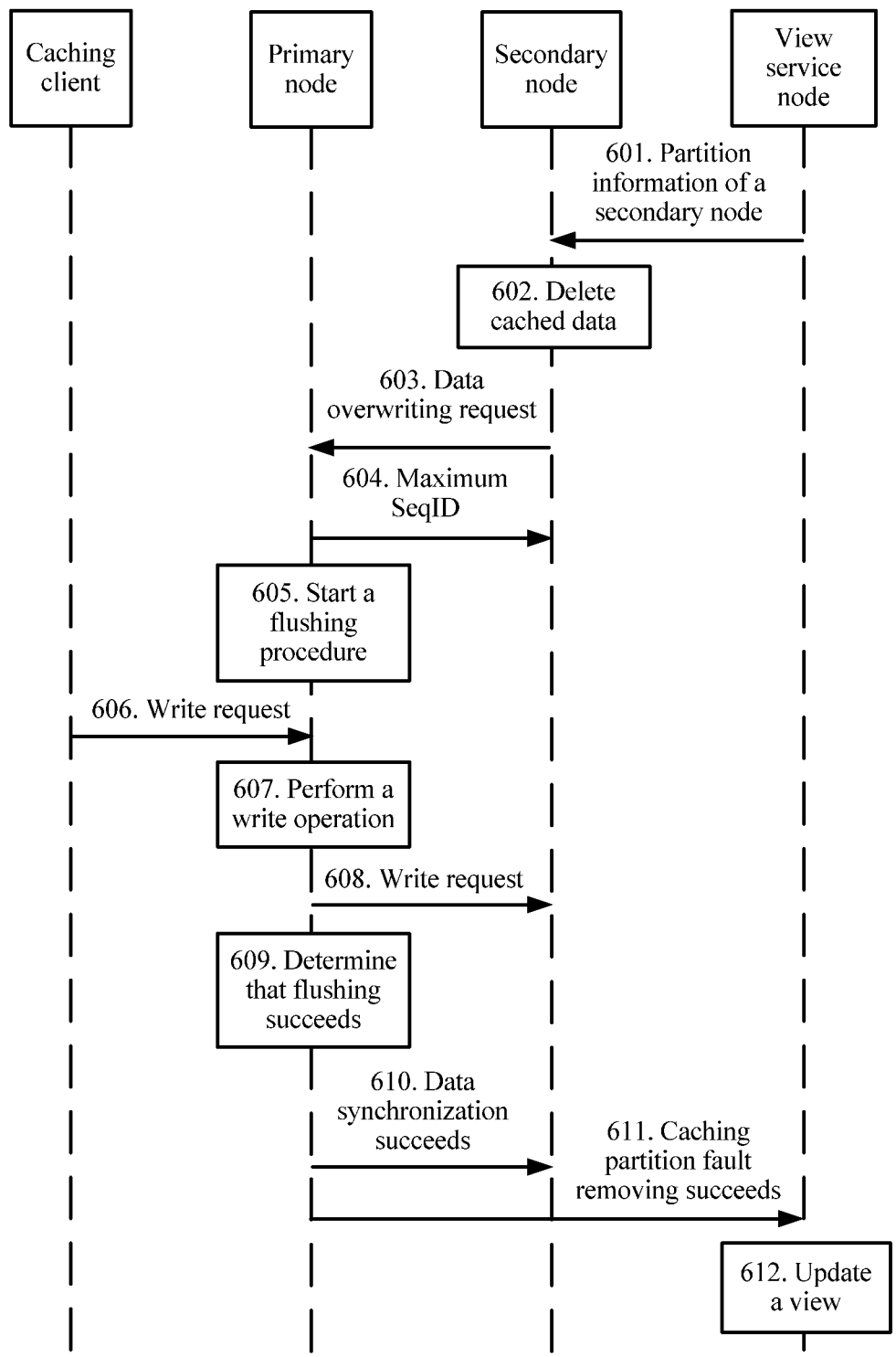
FIG. 6 is a signaling flowchart of a secondary-node fault removing procedure included in the caching method provided in embodiments of the present disclosure.

FIG. 6 is a signaling flowchart of a secondary-node fault removing procedure included in a caching method according to an embodiment of the present disclosure, and is a secondary-node fault removing procedure existing when an entry is stored in a non-persistent manner. Referring to FIG. 6, the method includes the following steps.

Step 601: When a secondary node is restarted after a fault of the secondary node is removed, the secondary node queries partition information of the secondary node with a view service node, or a view service node actively pushes partition information of the secondary node.

Step 602: The secondary node deletes cached data of a partition on which data overwriting needs to be performed.

Step 603: The secondary node sends a data overwriting request to a primary node.

Step 604: The primary node returns a maximum SeqID of the primary node to the secondary node.

Step 605: The primary node starts a flushing procedure, and flushes all dirty data (recorded as a set that is denoted as TO_FLUSH_SET) whose sequence number is less than or equal to the SeqID.

A specific flushing procedure is similar to a flushing procedure in the foregoing embodiment, and details are not described herein.

Step 606: The primary node receives a new write request in the flushing procedure.

In this embodiment of the present disclosure, if a to-be-written data block in the write request is not flushed, the primary node simultaneously executes the write request locally, and forwards the write request to all secondary nodes. In addition, the corresponding data block does not need to be flushed in the data overwriting procedure. If a to-be-written data block in the write request is being flushed, the primary node does not stop the flushing operation, but writes the to-be-written data after flushing ends.

Step 607: Execute the write request locally.

Step 608: Forward the write request to all secondary nodes.

Step 607 and step 608 may be simultaneously performed.

All the foregoing secondary nodes include not only a secondary node in a normal state but also a secondary node that is performing data overwriting in a secondary node fault removing procedure, and a corresponding data block is deleted from the TO_FLUSH_SET because new data is written into the data block. Therefore, data synchronization between the primary node and the secondary node is implemented, and flushing is not required temporarily.

Step 609: The primary node determines that all dirty data blocks in the TO_FLUSH_SET are successfully flushed.

Step 610: The primary node notifies the secondary node that data synchronization is completed.

Step 611: The primary node notifies the view service node that a fault of the partition of the secondary node is successfully removed.

Step 612: The view service node updates a view.

The updated view may be subsequently pushed to all related nodes.

The following further describes a secondary-node fault removing procedure existing when an entry is stored in a persistent manner. In one embodiment, in a normal write procedure, the entry may be stored in the persistent manner together with data, that is, the entry is written into a local write-back cache in the persistent manner together with data. When the entry is stored in the persistent manner together with data, entry information may be still restored from the local write-back cache after a fault of a secondary node is recovered. Therefore, data may be caught up from a primary node according to the entry, so as to implement data consistency between the primary node and the secondary node.

Figure 7:
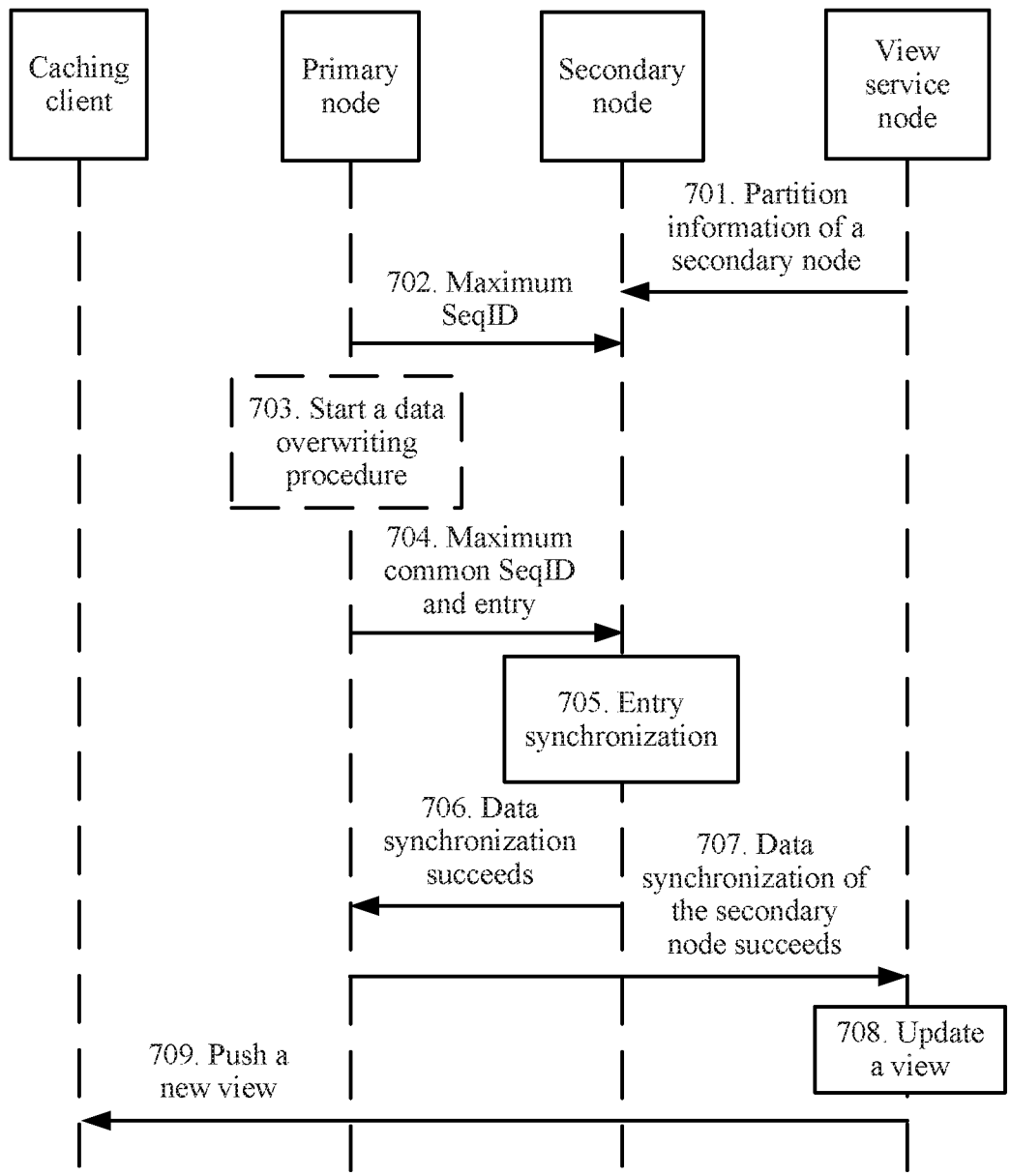
FIG. 7 is a signaling flowchart of another secondary-node fault removing procedure included in the caching method provided in embodiments of the present disclosure.

FIG. 7 is a signaling flowchart of a secondary-node fault removing procedure included in a caching method according to an embodiment of the present disclosure, and is a secondary-node fault removing procedure existing when an entry is stored in a persistent manner. Referring to FIG. 7, the method includes the following steps.

Step 701: When a secondary node is restarted after a fault of the secondary node is removed, the secondary node queries partition information of the secondary node with a view service node, or a view service node actively pushes partition information of the secondary node.

After knowing a primary node according to a view, the secondary node starts a fault removing procedure of the secondary node.

Step 702: The secondary node sends a maximum SeqID of the secondary node to a primary node.

Step 703: The primary node performs a data overwriting procedure if the primary node does not find a common SeqID of the primary node and the secondary node.

Step 704: If the primary node finds a maximum common seqID of the primary node and the secondary node, the primary node sends, to the secondary node, the maximum common SeqID of the primary node and the secondary node and each entry whose sequence number is greater than the maximum common SeqID.

Step 705: The secondary node calculates a set of differential entries, rolls back an entry that the secondary node has but the new primary node does not have, and catches up with an entry that the secondary node does not have but the new primary node has.

In one embodiment, the secondary node traverses, in a reversed order (a descending order of SeqIDs), a set of all entries that need to be rolled back, sequentially reads, from the primary node, data corresponding to the entry, and overwrites a local write-back cache. The secondary node traverses, in a positive order (an ascending order of SeqIDs), a set of all entries that need to be caught up, sequentially reads, from the primary node, data corresponding to the entry, and overwrites the local write-back cache. After the secondary node processes each differential entry, data of the secondary node is consistent with that of the primary node.

Step 706: The secondary node notifies the primary node that data catching up is successfully completed.

Step 707: After obtaining a response indicating that the secondary node has completed data catching up, the primary node reports to the view service node that data catching up is completed.

Step 708: The view service node updates a view.

Optionally, the method may further include the following steps.

Step 709: The view service node pushes a new view to all related nodes.

Figure 8:
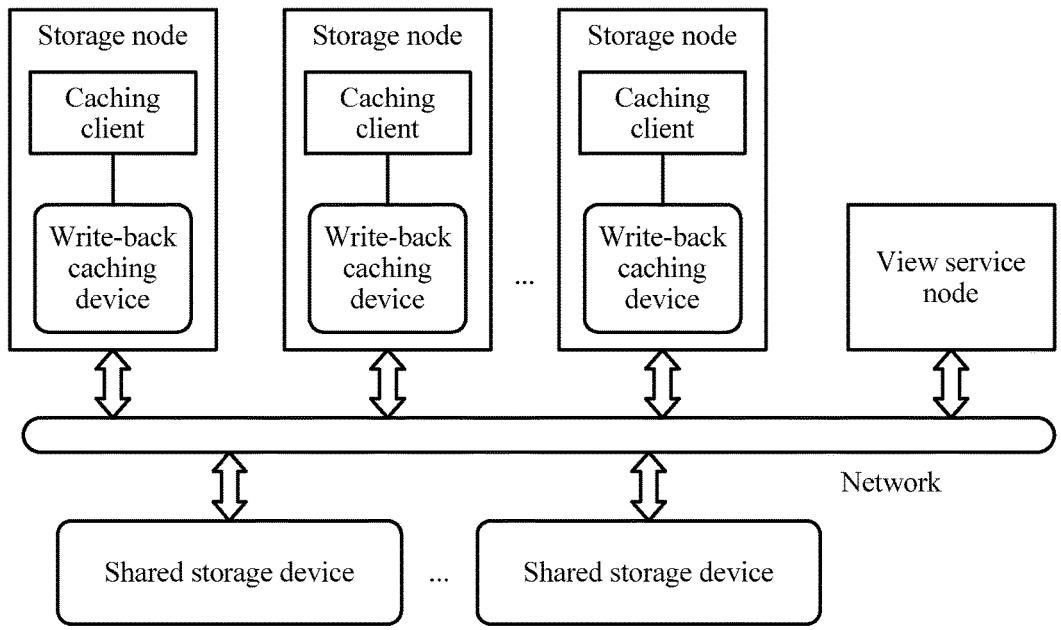
FIG. 8 is a schematic diagram of another system architecture on which the caching method provided in embodiments of the present disclosure is based.

FIG. 8 is a schematic diagram of another system architecture on which a caching method is based according to an embodiment of the present disclosure. In this system architecture, a caching client and a write-back caching device are deployed on one storage node. The caching method based on the system architecture is the same as the caching method described above, and details are not described herein again.

Figure 9:
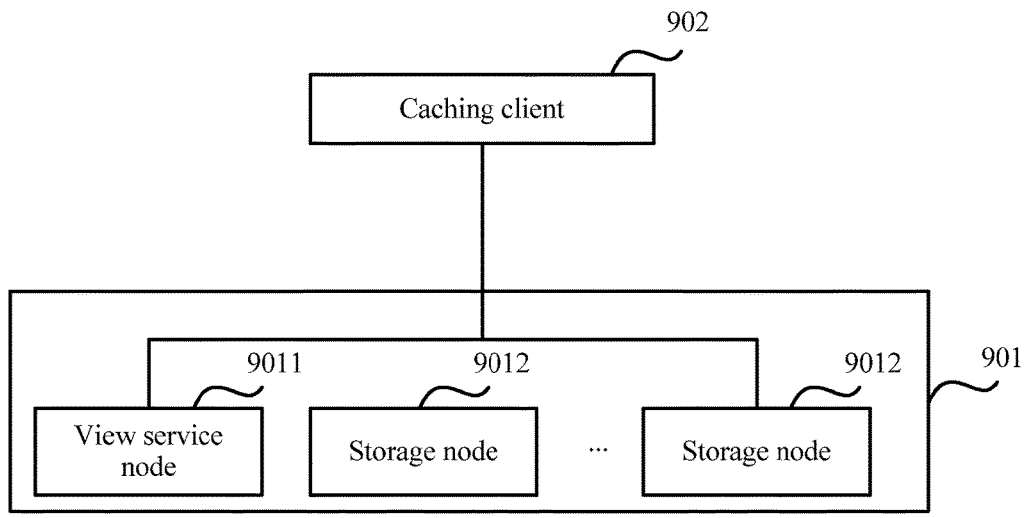
FIG. 9 is a structural diagram of a caching system based on a cache cluster according to an embodiment of the present disclosure.

FIG. 9 is a structural diagram of a caching system based on a cache cluster according to an embodiment of the present disclosure. The system is configured to execute the caching method based on a cache cluster that is provided in the embodiments of the present disclosure, and the system includes a cache cluster 901 and a caching client 902.

The cache cluster 901 includes a view service node 9011 and multiple storage nodes 9012. Each storage node 9012 includes at least one write-back caching device 90121. Each write-back caching device 90121 includes multiple sub-partitions. A plurality of the sub-partitions forms one caching partition. Each caching partition includes one primary sub-partition and at least one secondary sub-partition. The view service node 9011 is configured to record view information of each caching partition. The view information includes node information of a caching device in which each sub-partition included in each caching partition is located. A storage node in which a primary sub-partition of a first caching partition is located is a primary node of the first caching partition. A storage node in which each secondary sub-partition of the first caching partition is located is a secondary node of the first caching partition. The first caching partition is any caching partition in the cache cluster.

The caching client 902 is configured to determine a partition number of a caching partition corresponding to to-be-written data; query, with the view service node 9011 according to the partition number of the caching partition corresponding to the to-be-written data, primary node information of the caching partition corresponding to the to-be-written data; receive the primary node information that is of the caching partition corresponding to the to-be-written data and that is returned by the view service node 9011; and send, according to the primary node information of the caching partition corresponding to the to-be-written data, a write request to a primary node of the caching partition corresponding to the to-be-written data. The write request carries the to-be-written data.

The primary node of the caching partition corresponding to the to-be-written data is configured to write the to-be-written data into a local write-back cache according to the write request; obtain information about each secondary node of the caching partition corresponding to the to-be-written data from the view service node 9011; and copy the to-be-written data to each secondary node of the caching partition corresponding to the to-be-written data.

Optionally, the primary node of the caching partition corresponding to the to-be-written data is further configured to, before writing the to-be-written data into the local write-back cache according to the write request, query, with the view service node 9011, view information of the caching partition corresponding to the to-be-written data, and determine, according to the view information of the caching partition corresponding to the to-be-written data, that the primary node itself is the primary node of the caching partition corresponding to the to-be-written data.

Optionally, the view information further includes a primary-partition switching quantity of the caching partition corresponding to the to-be-written data.

The primary node of the caching partition corresponding to the to-be-written data is further configured to, after determining, according to the view information of the caching partition corresponding to the to-be-written data, that the primary node itself is the primary node of the caching partition corresponding to the to-be-written data, verify that a primary-partition switching quantity that is of the caching partition corresponding to the to-be-written data and that is carried in the write request is consistent with the primary-partition switching quantity that is carried in the view information of the caching partition corresponding to the to-be-written data.

Optionally, the primary node of the caching partition corresponding to the to-be-written data is further configured to generate an entry of the to-be-written data according to the write request, where the entry includes an operation sequence number and an operation parameter, and write the to-be-written data into the local write-back cache according to the operation sequence number and the operation parameter that are included in the entry.

Optionally, the primary node of the caching partition corresponding to the to-be-written data is further configured to send the write request and the entry to each secondary node of the caching partition corresponding to the to-be-written data.

Each secondary node of the caching partition corresponding to the to-be-written data is configured to query, with the view service node 9011, view information of the caching partition corresponding to the to-be-written data; receive the view information that is of the caching partition corresponding to the to-be-written data and that is returned by the view service node 9011, where the view information further includes a primary-partition switching quantity of the caching partition corresponding to the to-be-written data; verify that a primary-partition switching quantity that is of the caching partition corresponding to the to-be-written data and that is carried in the write request is consistent with the primary-partition switching quantity that is of the caching partition corresponding to the to-be-written data and that is included in the view information; verify that the operation sequence number in the entry is consistent with an expected operation sequence number; and write the data into a local write-back cache according to the operation sequence number and the operation parameter that are included in the entry.

Optionally, the view service node 9011 is configured to, after determining that a current primary node of a second caching partition is faulty, select a new primary node for the second caching partition, update view information of the second caching partition, and push the updated view information to the primary node and each secondary node of the second caching partition.

The new primary node selected for the second caching partition is configured to, after determining, according to the updated view information, that the new primary node is the primary node of the second caching partition, start a primary-node switching synchronization procedure of the primary node, and suspend all new modification services of the second caching partition.

Each secondary node of the second caching partition is configured to determine, according to the updated view information, that the primary node of the second caching partition is updated, and start a primary-node switching synchronization procedure of the secondary node.

With respect to a technical problem faced by a large-scale distributed write-back cache cluster, the present disclosure provides a method and a system for implementing high consistency in multiple duplicates in a distributed write-back cache. Using a multi-duplicate mechanism that especially supports three or more duplicates, a high-reliability requirement and a high-availability requirement of a cache cluster on a write-back cache can be met. In addition, using design of a data partitioning procedure, a data normal procedure, and a fault recovery procedure, requirements of the cache cluster on horizontal expansion and fast fault removing are ensured.

A person skilled in the art may be further aware that, the units and algorithm steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person of ordinary skill in the art may understand that all or some the steps in each of the foregoing method of the embodiments may be implemented by a program instructing a processor. The foregoing program may be stored in a computer readable storage medium. The storage medium may be a non-transitory medium, such as a RAM, a read-only memory (ROM), a flash memory, a hard disk, a solid state drive, a magnetic tape, a floppy disk, an optical disc, or any combination thereof.

The foregoing descriptions are only specific implementation examples of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A caching method based on a cache cluster, the cache cluster comprising a view service node and multiple storage nodes, each storage node comprising at least one write-back caching device, each write-back caching device comprising multiple sub-partitions, a plurality of the sub-partitions forming one caching partition, each caching partition comprising one primary sub-partition and at least one secondary sub-partition, the view service node being configured to record view information of each caching partition, the view information comprising node information of a caching device in which each sub-partition comprised in each caching partition is located, a storage node in which a primary sub-partition of a first caching partition is located being a primary node of the first caching partition, a storage node in which each secondary sub-partition of the first caching partition is located being a secondary node of the first caching partition, the first caching partition being any caching partition in the cache cluster, and the method comprising:

determining, by a caching client, a partition number of a caching partition corresponding to to-be-written data;

querying, by the caching client with the view service node according to the partition number of the caching partition corresponding to the to-be-written data, primary node information of the caching partition corresponding to the to-be-written data;

receiving, by the caching client, the primary node information of the caching partition corresponding to the to-be-written data and returned by the view service node;

sending, according to the primary node information of the caching partition corresponding to the to-be-written data, a write request to a primary node of the caching partition corresponding to the to-be-written data, the write request carrying the to-be-written data;

writing, by the primary node of the caching partition corresponding to the to-be-written data, the to-be-written data into a local write-back cache according to the write request;

obtaining, by the primary node of the caching partition corresponding to the to-be-written data, information about each secondary node of the caching partition corresponding to the to-be-written data from the view service node; and copying the to-be-written data to each secondary node of the caching partition corresponding to the to-be-written data.

2. The method according to claim 1, wherein before writing, by the primary node of the caching partition corresponding to the to-be-written data, the to-be-written data into the local write-back cache according to the write request, the method further comprises:

querying, with the view service node by the primary node of the caching partition corresponding to the to-be-written data, view information of the caching partition corresponding to the to-be-written data; and determining, by the primary node of the caching partition corresponding to the to-be-written data according to the view information of the caching partition corresponding to the to-be-written data, that the primary node itself is the primary node of the caching partition corresponding to the to-be-written data.

3. The method according to claim 2, wherein the view information further comprises a primary sub-partition switching quantity of the caching partition corresponding to the to-be-written data, and after determining, by the primary node of the caching partition corresponding to the to-be-written data according to the view information of the caching partition corresponding to the to-be-written data, that the primary node itself is the primary node of the caching partition corresponding to the to-be-written data, the method further comprises verifying that a primary-partition switching quantity of the caching partition corresponding to the to-be-written data and carried in the write request is consistent with the primary-partition switching quantity carried in the view information of the caching partition corresponding to the to-be-written data.

4. The method according to claim 1, wherein writing, by the primary node of the caching partition corresponding to the to-be-written data, the to-be-written data into the local write-back cache according to the write request comprises:

generating, by the primary node of the caching partition corresponding to the to-be-written data, an entry of the to-be-written data according to the write request, the entry comprising an operation sequence number and an operation parameter; and writing the to-be-written data into the local write-back cache according to the operation sequence number and the operation parameter that are comprised in the entry.

5. The method according to claim 4, wherein copying the to-be-written data to each secondary node of the caching partition corresponding to the to-be-written data comprises:

sending, by the primary node of the caching partition corresponding to the to-be-written data, the write request and the entry to each secondary node of the caching partition corresponding to the to-be-written data;

querying, with the view service node by each secondary node of the caching partition corresponding to the to-be-written data, view information of the caching partition corresponding to the to-be-written data;

receiving, by each secondary node of the caching partition corresponding to the to-be-written data, the view information of the caching partition corresponding to the to-be-written data and returned by the view service node, the view information further comprising a primary-partition switching quantity of the caching partition corresponding to the to-be-written data;

verifying, by each secondary node of the caching partition corresponding to the to-be-written data, that a primary-partition switching quantity of the caching partition corresponding to the to-be-written data and carried in the write request is consistent with the primary-partition switching quantity of the caching partition corresponding to the to-be-written data and comprised in the view information;

verifying, by each secondary node of the caching partition corresponding to the to-be-written data, that the operation sequence number in the entry is consistent with an expected operation sequence number; and writing, by each secondary node of the caching partition corresponding to the to-be-written data, the data into a local write-back cache according to the operation sequence number and the operation parameter that are comprised in the entry.

6. The method according to claim 1, further comprising:

when the view service node determines that a current primary node of a second caching partition is faulty:

selecting, by the view service node, a new primary node for the second caching partition;

updating view information of the second caching partition; and pushing the updated view information to the primary node and each secondary node of the second caching partition, after determining, according to the updated view information, that the new primary node is the primary node of the second caching partition:

starting, by the new primary node selected for the second caching partition, a primary-node switching synchronization procedure of the primary node; and suspending all new modification services of the second caching partition;

determining, by each secondary node of the second caching partition according to the updated view information, that the primary node of the second caching partition is updated; and starting a primary-node switching synchronization procedure of the secondary node.

7. A caching system based on a cache cluster, the system comprising:

the cache cluster comprising a view service node and multiple storage nodes, each storage node comprising at least one write-back caching device, each write-back caching device comprising multiple sub-partitions, a plurality of the sub-partitions forming one caching partition, each caching partition comprising one primary sub-partition and at least one secondary sub-partition, the view service node being configured to record view information of each caching partition, the view information comprising node information of a caching device in which each sub-partition comprised in each caching partition is located, a storage node in which a primary sub-partition of a first caching partition is located being a primary node of the first caching partition, a storage node in which each secondary sub-partition of the first caching partition is located being a secondary node of the first caching partition, and the first caching partition being any caching partition in the cache cluster; and a caching client configured to:
determine a partition number of a caching partition corresponding to to-be-written data;
query, with the view service node according to the partition number of the caching partition corresponding to the to-be-written data, primary node information of the caching partition corresponding to the to-be-written data;
receive the primary node information of the caching partition corresponding to the to-be-written data and returned by the view service node; and
send, according to the primary node information of the caching partition corresponding to the to-be-written data, a write request to a primary node of the caching partition corresponding to the to-be-written data, the write request carrying the to-be-written data, the primary node of the caching partition corresponding to the to-be-written data being configured to:
write the to-be-written data into a local write-back cache according to the write request;
obtain information about each secondary node of the caching partition corresponding to the to-be-written data from the view service node; and
copy the to-be-written data to each secondary node of the caching partition corresponding to the to-be-written data.

8. The system according to claim 7, wherein before writing the to-be-written data into the local write-back cache according to the write request, the primary node of the caching partition corresponding to the to-be-written data is further configured to:
query, with the view service node, view information of the caching partition corresponding to the to-be-written data; and determine, according to the view information of the caching partition corresponding to the to-be-written data, that the primary node itself is the primary node of the caching partition corresponding to the to-be-written data.

9. The system according to claim 8, wherein the view information further comprises a primary-partition switching quantity of the caching partition corresponding to the to-be-written data, and the primary node of the caching partition corresponding to the to-be-written data is further configured to, after determining, according to the view information of the caching partition corresponding to the to-be-written data, that the primary node itself is the primary node of the caching partition corresponding to the to-be-written data, verify that a primary-partition switching quantity that is of the caching partition corresponding to the to-be-written data and that is carried in the write request is consistent with the primary-partition switching quantity carried in the view information of the caching partition corresponding to the to-be-written data.

10. The system according to claim 7, wherein the primary node of the caching partition corresponding to the to-be-written data is further configured to:
generate an entry of the to-be-written data according to the write request, the entry comprising an operation sequence number and an operation parameter; and
write the to-be-written data into the local write-back cache according to the operation sequence number and the operation parameter that are comprised in the entry.

11. The system according to claim 10, wherein the primary node of the caching partition corresponding to the to-be-written data is further configured to send the write request and the entry to each secondary node of the caching partition corresponding to the to-be-written data, and each secondary node of the caching partition corresponding to the to-be-written data is configured to:
query, with the view service node, view information of the caching partition corresponding to the to-be-written data;
receive the view information that is of the caching partition corresponding to the to-be-written data and that is returned by the view service node, the view information further comprising a primary-partition switching quantity of the caching partition corresponding to the to-be-written data;
verify that a primary-partition switching quantity that is of the caching partition corresponding to the to-be-written data and that is carried in the write request is consistent with the primary-partition switching quantity that is of the caching partition corresponding to the to-be-written data and that is comprised in the view information;
verify that the operation sequence number in the entry is consistent with an expected operation sequence number; and
write the data into a local write-back cache according to the operation sequence number and the operation parameter that are comprised in the entry.

12. The system according to claim 7, wherein after determining that a current primary node of a second caching partition is faulty, the view service node is configured to:
select a new primary node for the second caching partition;
update view information of the second caching partition; and
push the updated view information to the primary node and each secondary node of the second caching partition, the new primary node selected for the second caching partition, after determining, according to the updated view information, that the new primary node is the primary node of the second caching partition, being configured to:

start a primary-node switching synchronization procedure of the primary node; and suspend all new modification services of the second caching partition, and each secondary node of the second caching partition being configured to determine, according to the updated view information, that the primary node of the second caching partition is updated, and start a primary-node switching synchronization procedure of the secondary node.

* * * * *